United States Patent
Shen (10) Patent No.: US 10,708,730 B2
(45) Date of Patent: Jul. 7, 2020

(54) SDCI PULL AND PUSH MODE OPTIMIZATION

(71) Applicant: NOKIA SOLUTIONS AND NETWORKS OY, Espoo (FI)

(72) Inventor: Yang Shen, Beijing (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 16/340,518

(22) PCT Filed: Oct. 9, 2016

(86) PCT No.: PCT/CN2016/101548
§ 371 (c)(1),
(2) Date: Apr. 9, 2019

(87) PCT Pub. No.: WO2018/064826
PCT Pub. Date: Apr. 12, 2018

(65) Prior Publication Data
US 2019/0246247 A1   Aug. 8, 2019

(51) Int. Cl.
| | | |
|---|---|---|
| *H04M 11/00* | (2006.01) | |
| *H04W 4/24* | (2018.01) | |
| *H04L 12/14* | (2006.01) | |
| *H04M 15/00* | (2006.01) | |
| *H04L 29/08* | (2006.01) | |

(52) U.S. Cl.
CPC .............. *H04W 4/24* (2013.01); *H04L 12/14* (2013.01); *H04L 12/1407* (2013.01); *H04L 67/2852* (2013.01); *H04M 15/00* (2013.01); *H04M 15/09* (2013.01); *H04M 15/66* (2013.01)

(58) Field of Classification Search
CPC ....... H04W 4/24; H04M 15/66; H04M 15/00; H04M 15/09; H04L 12/14; H04L 67/2852; H04L 12/1407
USPC .......................................... 455/406; 370/338
See application file for complete search history.

(56) References Cited

U.S. PATENT DOCUMENTS

| | | |
|---|---|---|
| 2012/0271958 A1 | 10/2012 | Oh |
| 2013/0016658 A1 | 1/2013 | Lovsen et al. |
| 2014/0153391 A1 | 6/2014 | Ludwig et al. |

(Continued)

FOREIGN PATENT DOCUMENTS

WO   WO 2009/118038 A1   10/2009

OTHER PUBLICATIONS

International Search Report and Written Opinion dated May 17, 2017 corresponding to International Patent Application No. PCT/CN2016/101548.

(Continued)

*Primary Examiner* — Marcos Batista
(74) *Attorney, Agent, or Firm* — Squire Patton Boggs (US) LLP (57) ABSTRACT

A method, apparatus, and machine readable non-transitory storage medium for a SDCI pull and push mode optimization are provided, which comprise synchronizing a caching timer and an allowed delay between a Policy and Charging Enforcement Function (PCEF) and a Packet Flow Description Function (PFDF); comparing the caching timer and the allowed delay; and pushing an updated Packet Flow Description (PFD) from the PFDF to the PCEF based on a result of the comparing.

20 Claims, 4 Drawing Sheets

(56) References Cited

U.S. PATENT DOCUMENTS

2019/0253870 A1* 8/2019 Ronneke ............ H04W 92/045

OTHER PUBLICATIONS

3GPP TS 23.682 V14.1.0 (Sep. 2016), Technical Specification, 3rd Generation Partnership Project; Technical Specification Group Services and System Aspects; Architecture enhancements to facilitate communications with packet data networks and applications (Release 14); Sep. 2016.
3GPP TS 23.203 V14.1.0 (Sep. 2016), Technical Specification, 3rd Generation Partnership Project; Technical Specification Group Services and System Aspects; Policy and charging control architecture (Release 14), Sep. 2016.
European Search Report dated Apr. 28, 2020 corresponding to European Patent Application No. 16918160.9.
Ericsson et al: "Management of PFDs to PCEF/TDF," 3GPP DRAFT; 23203_CR1036R7_SDCI_(REL-14)_S2-165039 was 4724 SDCI_23203 Management of PFD_V4, vol. SA WG2, No. Sanya, China, Sep. 16, 2016, XP051679628.

* cited by examiner

FIG. 1

201  sending a PFD fetching request from PCEF to PFDF, wherein the PFD fetching request includes an application identifier 202  triggering a reset of the caching timer based on a preconfigured value in the PFDF, if the PFD fetching request is received 203  determining a validity of the application identifier based on the caching timer 204  comparing the caching timer and the allowed delay 205  pushing (distributing directly or notifying the PCEF to fetch the PFD within the allowed delay) an updated PFD associated with the valid application identifier from the PFDF to the PCEF, if the allowed delay is smaller than the caching timer

SDCI PULL AND PUSH MODE OPTIMIZATION

TECHNICAL FIELD

The present invention relates to the field of a network optimization, and more particularly, to a SDCI pull and push mode optimization.

BACKGROUND

In order to avoid overloading a Gx/Sd interface with a list of packet flow detection filters which may include beyond 5 Tuples higher layer information over a Gx/Sd Diameter session set up for each user, a PCC/ADC rule sent by a PCRF to a PCEF/TDF contains an application identifier that refers to an application detection filter preconfigured in the PCEF/TDF. Since an ASP may provision, update or delete the filters from time to time, SDCI features are introduced into 3GPP, which enable the ASP to flexibly manage the application detection filters through a SCEF and a newly introduced PFDF. The PFDF is responsible for the management of PFDs (i.e. provision, modification and removal) according to the instructions received from the SCS/AS (owned by the ASP) via the SCEF, as is defined in TS 23.682, and the PFD is an extension of the application detection filter that is preconfigured in the PCEF/TDF.

According to the definition in 3GPP TS 23.203, the PFD may be retrieved by the PCEF/TDF in a pull mode from the PFDF or may be provisioned from the PFDF to the PCEF/TDF in a push mode. When the push mode is used, the PFDF distributes the PFD for each application identifier to the PCEF/TDF, which enables access to the application. There have been three methods to provision the PFD from the PFDF to the PCEF/TDF:

(1) Push of the whole PFDF state according to an operator configuration in the PFDF (e.g., provision per day according to the operator configuration);

(2) Selectively push of an ASP change in the PFD set (i.e. the ASP changes the PFD set while the operator configuration defines when to push);

(3) Selectively push of the ASP change in the PFD set according to the ASP request (i.e. the ASP indicates to push changes in the PFD set within a time interval indicated by an allowed delay.)

When the pull mode is used, at the time a PCC/ADC Rule with an application identifier for which PFDs are not available is activated or provisioned, the PCEF/TDF requests all PFDs for that application identifier from the PFDF. The PFDs retrieved for the application identifier from the PFDF may be cached in the PCEF/TDF with an associated caching timer to control how long the PFDs are valid. When the caching timer elapses, if there are still active PCC/ADC rules that refer to the corresponding application identifiers, the PCEF/TDF reloads the PFDs from the PFDF.

However, there are multiple problems in such process:

Problem 1: When the pull mode is used alone, if PFDs stored in the PFDF are modified by the ASP, they can't be applied in the PCEF/TDF immediately for the application detection until the caching timer in the PCEF/TDF expires.

Problem 2: When the push mode is used alone, if PFDs stored in the PFDF are modified by the ASP, the PFDF has to push all the changed PFDs to all the PCEF/TDFs that enable access to those applications, which may lead to a high workload and storage in the PCEF/TDF, even if some potentially impacted application sessions are not alive yet. Since the operators have claimed big concern of the PFD storage in the PCEF/TDF when SDCI study is initiated, the problem can't be ignored. In addition, the payload of Gw/Gwn interface between PFDF and PCEF/TDF is also highly increased.

For problem 1, the prior art has provided two options: (1) the caching timer can be set very short, so that it won't miss any change of PFDs stored in the PFDF, however, it will increase the signaling between the PFDF and the PCEF/TDF. (2) It is proposed in the 3GPP TS23.203 that "within one PLMN, a combination of the pull and push mode may be supported if the feature is supported." However, such problem 2 is then introduced. In addition, if the push mode is requested with an allowed delay that is larger than the time interval for the pull mode to fetch the PFDs, some unnecessary signaling is introduced, i.e., the updated PFDs have already been fetched by the PCEF/TDF within the allowed delay.

For problem 2, there's no standardized solution so far. It might be resolved by the pre-configuration, i.e., the PFDF may be configured to provision the PFDs pertaining to a specific APN to the PCEF/TDF which supports the APN. However, the granularity of APN is far from enough to differentiate various ongoing application sessions which the updated PFDs would be applied to, and the PCEF/TDF has to store many PFDs which are not used within the caching timer. The PCEF/TDF should remove the PFDs which are not used as soon as possible after receiving all of them to save the storage.

Therefore, in order to solve the above problems, there is a need to improve the way of handling the transfer of updated PFDs.

SUMMARY

According to one aspect of the present invention, there is provided a method comprising: synchronizing a caching timer and an allowed delay between a Policy and Charging Enforcement Function (PCEF) and a Packet Flow Description Function (PFDF); comparing the caching timer and the allowed delay; and pushing an updated Packet Flow Description (PFD) from the PFDF to the PCEF based on a result of the comparing.

According to one aspect of the present invention, there is provided an apparatus comprising: at least one processor; and at least one memory including a computer program code, wherein the at least one memory and the computer program code are configured, with the at least one processor, for: synchronizing a caching timer and an allowed delay between a Policy and Charging Enforcement Function (PCEF) and a Packet Flow Description Function (PFDF); comparing the caching timer and the allowed delay; and pushing an updated Packet Flow Description (PFD) from the PFDF to the PCEF based on a result of the comparing.

According to one aspect of the present invention, there is provided a machine readable non-transitory storage medium comprising instructions executable by a processor for: synchronizing a caching timer and an allowed delay between a Policy and Charging Enforcement Function (PCEF) and a Packet Flow Description Function (PFDF); comparing the caching timer and the allowed delay; and pushing an updated Packet Flow Description (PFD) from the PFDF to the PCEF based on a result of the comparing.

Embodiments of the present invention are defined in the dependent claims.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, a reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the terms "having", "containing", "including", "comprising" and the like are open ended terms that indicate the presence of stated elements or features but do not preclude additional elements or features. The articles "a", "an" and "the" are intended to include the plural as well as the singular, unless the context clearly indicates otherwise.

The application identifier refers to the application detection filter preconfigured in the PCEF/TDF. The ASP may provision, update or delete the filters from time to time. In 3GPP, SDCI features are introduced to enable the ASP to flexibly manage the application detection filter through SCEF and PFDF. The PFDF is responsible for the management of PFDs (i.e. provision, modification and removal) according to the instructions received from the SCS/AS (owned by the ASP) via the SCEF (see TS 23.682).

In the PCEF/TDF, the caching timer is already defined, mainly for storage saving purpose. If the caching timer expires with no valid (ongoing) session requiring the retrieved PFD(s), the PFD(s) can be removed from the PCEF/TDF; otherwise, PFD fetching is triggered again. Further, an allowed delay has been defined between the SCEF and the PFDF. Conventionally, the caching timer and the allowed delay are individually used for different purposes: allowed delay for the push mode and caching timer for the pull mode. According to the present invention, it is proposed to add standardized messages flows to either introduce the allowed delay to the PCEF or trigger a reset of a local caching timer in the PFDF. With this, for the pull mode as well as for the push mode the update transfer can be optimized.

Moreover, the present invention is to trigger the reset of the local caching timer in the PFDF with the PFD fetching message for it to identify which PFD(s) is really needed in the live session in the PCEF/TDF (i.e. the context of the PFD(s)), because the PFDF has no knowledge of the context of the PFD(s) in the PCEF/TDF. Only the PFD(s) that will be applied to the current live ongoing session can be pushed to the PCEF/TDF. That is to further save the storage of the PCEF/TDF. i.e. the PFDF knows not only WHERE but also WHEN to push the PFD.

The allowed delay has been defined between the SCEF and the PFDF, but it is not known to the PCEF/TDF, because it is thought that the SCEF and PFDF are the nodes to apply the allowed delay required by the 3rd party for the push without considering the caching timer (because the caching timer is maintained in the PCEF/TDF).

The present disclosure here is to either introduce the allowed delay to the PCEF or trigger the reset of the local caching timer in the PFDF, by comparing the values of caching timer and allowed delay, it can decide whether the push mode (or the pull mode triggered by the push mode notification) is needed (assuming the pull mode is always needed), which largely saves the signaling.

Embodiment 1

Figure 1:
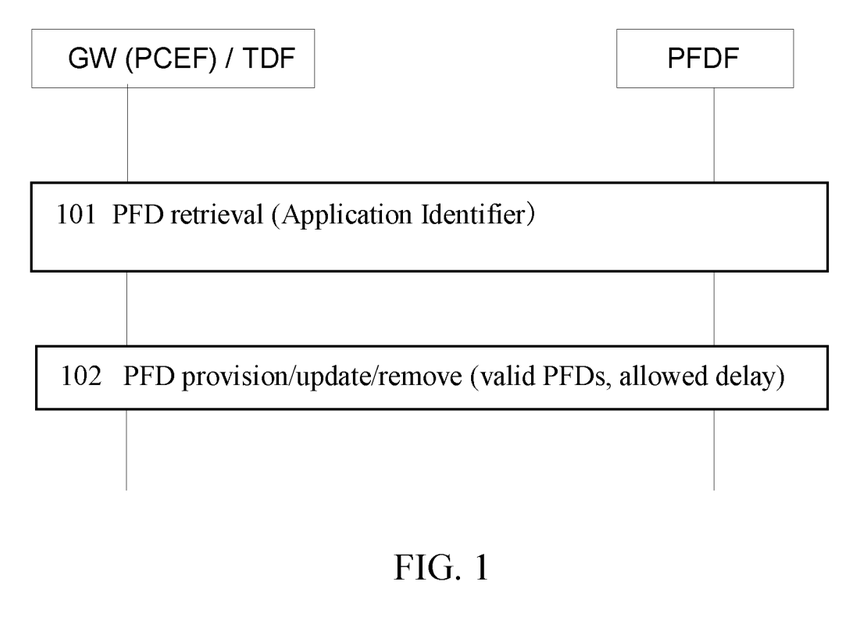
FIG. 1 illustrates an example schematic diagram of the method according to a first embodiment of the present invention.

FIG. 1 illustrates the example schematic diagram of the method according to the first embodiment of the present invention. PCEF/TDF retrieves 101 from the PFDF the PFDs for the application identifier(s) by sending a PFD fetching request, in which the application Identifier(s) is included. The PFDF resets the local caching timer for the application identifier based on a preconfigured value in the PFDF and provides the PFDs to the PCEF/TDF. When the caching timer expires and no new PFD fetching request for the application identifier is received, the PFDF takes this application identifier as "not valid". If the allowed delay (if provided by the SCEF) is smaller than the caching timer, the PFDF provisions/updates/removes or notifies the PCEF/TDF to fetch within the allowed delay 102 only the PFDs associated with the valid application identifier(s) to the PCEF/TDF; otherwise, this step can be skipped.

In this embodiment, the PFDF resets the local caching timer during the pull mode procedure. The PFDF determines the validity of the application identifier associated with the PFDs based on the local caching timer and, distributes directly or notifies the PCEF/TDF to fetch within the allowed delay the updated PFDs to the PCEF/TDF only when the allowed delay is smaller than the caching timer during the push mode procedure.

Figure 2:
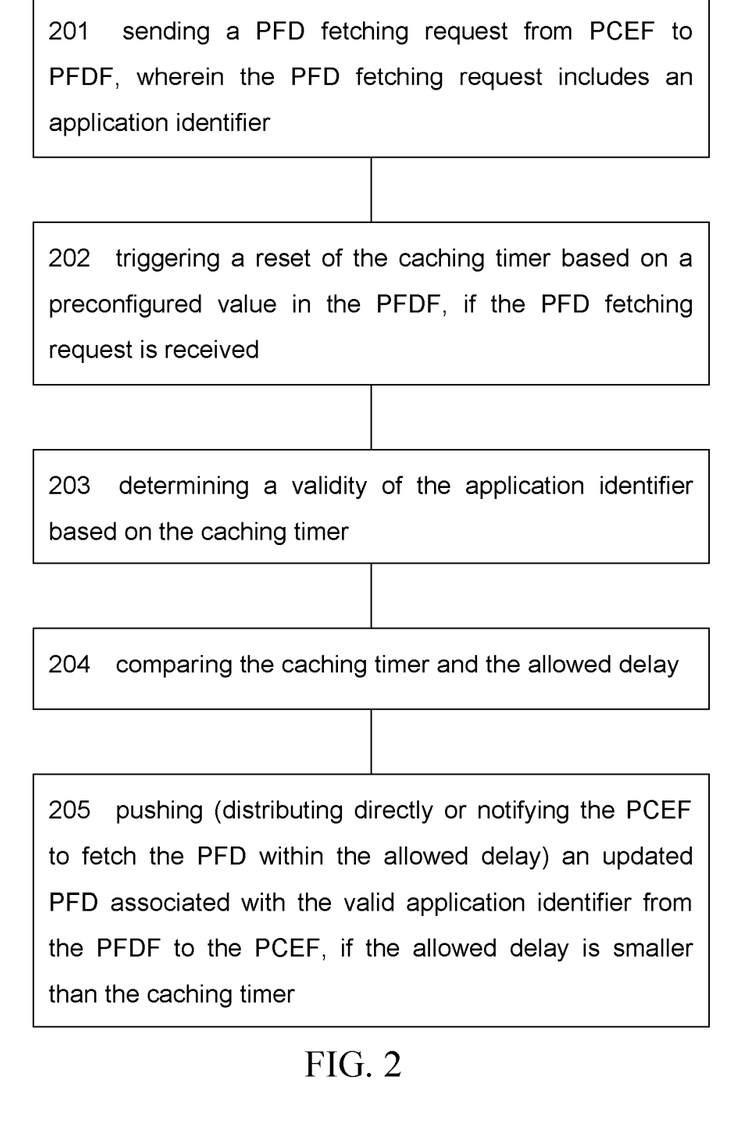
FIG. 2 illustrates an example flow diagram of the method according to the first embodiment of the present invention.

FIG. 2 illustrates the example flow diagram of the method according to the first embodiment of the present invention. The PCEF firstly sends the PFD fetching request to the PFDF in block 201. The PFD fetching request includes the application identifier. Then the process proceeds to block 202, where PFDF resets the caching timer based on a preconfigured value in the PFDF. Then the process proceeds to block 203, where PFDF determines the validity of the application identifier based on the caching timer. Then the process proceeds to block 204, where the values of caching timer and the allowed delay are compared. Then the process proceeds to block 205. PFDF may push (distribute directly or notify the PCEF/TDF to fetch within the allowed delay) the updated PFD associated with the valid application identifier to the PCEF, if the allowed delay is smaller than the caching timer.

Embodiment 2

Figure 3:
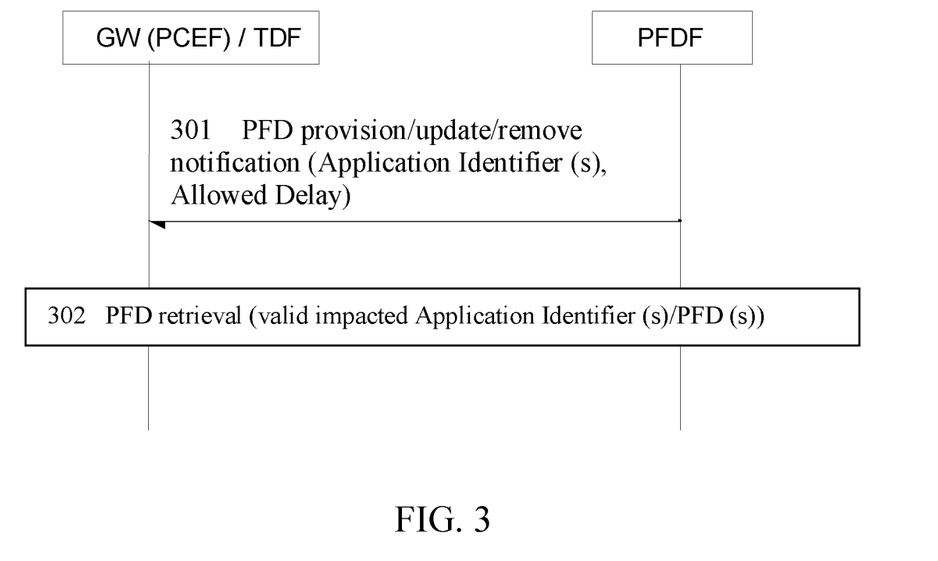
FIG. 3 illustrates an example schematic diagram of the method according to a second embodiment of the present invention.

FIG. 3 illustrates the example schematic diagram of the method according to the second embodiment of the present invention. When the ASP provisions/updates/removes the PFDs associated with the application identifier(s) in the PFDF, the PFDF may notify 301 the PCEF/TDF with the impacted application identifier(s) and an allowed delay. If the allowed delay is smaller than the caching timer, the PCEF/TDF (when it is available) may identify the impacted application identifiers which are currently valid and retrieve 302 from the PFDF the PFDs for the application identifier(s) by sending a PFD fetching request, in which only the valid and impacted application identifier(s) are included. The PFDF may respond with the requested PFD(s) associated with the application identifier(s).

In this embodiment, PFDF may notify PCEF/TDF that some PFDs are updated. In the notification, PFDF could send the allowed delay, as is required by the ASP, indicating how urgent the updated PFD can be fetched by the PCEF/TDF. If the allowed delay is larger than the caching timer, no additional pull mode PFD retrieval is triggered; otherwise, the PCEF/TDF can initiate the pull mode PFD retrieval to request the updated PFDs which are currently in use in the PCEF/TDF within the allowed delay.

Figure 4:
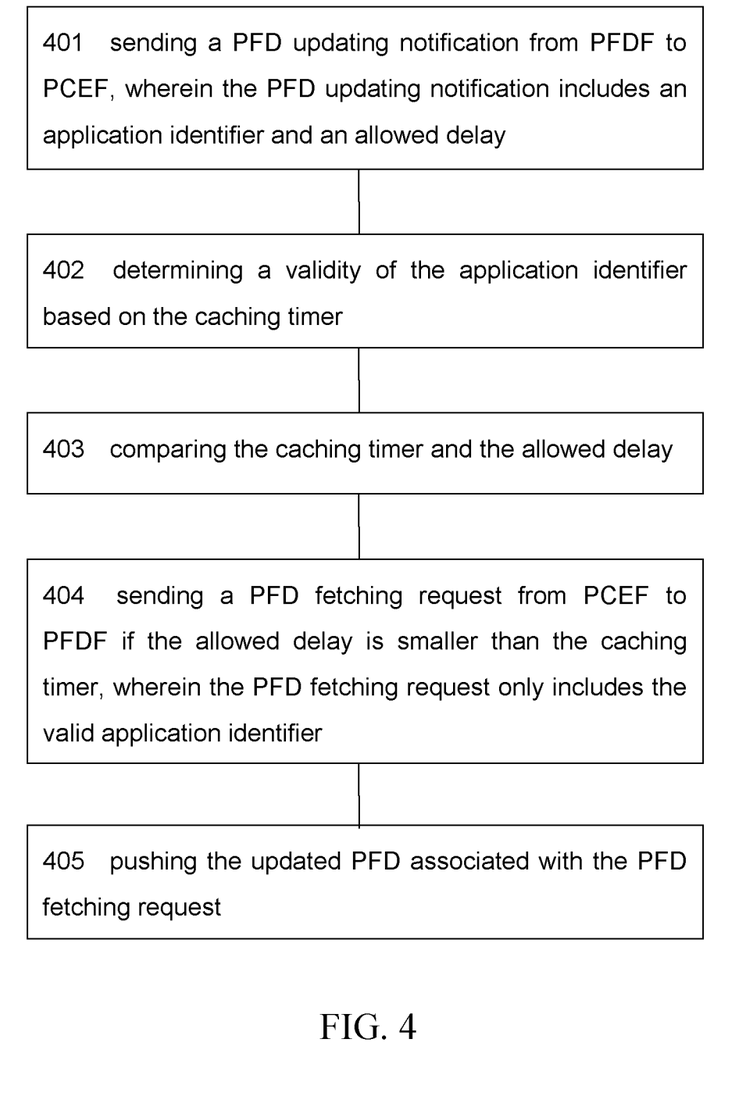
FIG. 4 illustrates an example flow diagram of the method according to the second embodiment of the present invention.

FIG. 4 illustrates the example flow diagram of the method according to the second embodiment of the present invention. The PFDF firstly sends the PFD updating notification to PCEF in block 401. The PFD updating notification may include the application identifier and the allowed delay. Then the process proceeds to block 402, where PCEF may determine the validity of the application identifier based on the caching timer. Then the process proceeds to block 403, where the values of caching timer and the allowed delay are compared. Then the process proceeds to block 404. The PCEF may send a PFD fetching request to PFDF if the allowed delay is smaller than the caching timer. The PFD fetching request only includes the valid application identifier, which the updated PFD is associated with. The process proceeds to block 405, where the PFDF may push the updated PFD associated with the PFD fetching request.

Evaluations

While evaluating the technical solutions in the above embodiments, the following criteria can be considered:
Whether the storage in the PCEF/TDF is saved?
Whether the signaling on Gw/Gwn is saved?
Does it allow the PCEF/TDF to handle it when there's available resource?
Does it bring any complexity to the PCEF/TDF?
Does it bring any complexity to the PFDF?

TABLE 1

| Solution | PCEF/TDF storage | Gw/Gwn signaling | PCEF/TDF availability allowed | Complexity in PCEF/TDF | Complexity in PFDF |
| --- | --- | --- | --- | --- | --- |
| Embodiment 1 | low | low, the signaling might be saved if allowed delay is larger than the caching timer | yes, if the notification is sent to PCEF/TDF for the PFD retrieval | low | fair, the PECF/TDF needs to maintain the caching timer to identify which PFDs subject to the change are in use in the PECF/TDF |
| Embodiment 2 | low | low, although the notification is added, the signaling can be saved if allowed delay is larger than the caching timer | yes | fair, the PECF/TDF needs to identify which PFDs subject to the change are in use in the PECF/TDF | low |
| Prior Art | high | high | no | low | low |

Based on the above analysis in the table 1, the present embodiments have large improvement in the PCEF/TDF storage saving and Gw/Gwn signaling saving. So both the embodiments can be considered as the optimization solution.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

LIST OF ABBREVIATIONS

ADC Application Detection Control
APN ACCESS POINT NAME
ASP Application Service Provider
PCC Policy and Charging Control
PCEF Policy and Charging Enforcement Function
PCRF Policy and Charging Rule Function
PFD Packet Flow Description
PFDF Packet Flow Description Function
PLMN Public Land Mobile Network
TDF Traffic Detection Function
SCEF Service Capability Exposure Function
SCS Service Capability Server
SDCI Sponsor Data Connectivity Improvement

What is claimed is:

1. A method, comprising:
   synchronizing a caching timer and an allowed delay between a policy and charging enforcement function (PCEF) or a traffic detection function (TDF) and a packet flow description function (PFDF);
   comparing the caching timer and the allowed delay; and
   pushing an updated packet flow description (PFD) from the PFDF to the PCEF or to the TDF, respectively, based on a result of the comparing.

2. The method according to claim 1, wherein the synchronizing comprises:
   sending a PFD fetching request which includes an application identifier from the PCEF or from the TDF, respectively, to the PFDF.

3. The method according to claim 2, further comprising:
   determining a validity of the application identifier based on the caching timer,
   wherein the updated PFD is associated with the valid application identifier.

4. The method according to claim 3, wherein the determining comprises:
   determining the application identifier is not valid, if the caching timer expires and no new PFD fetching request for the application identifier is received.

5. The method according to claim 1, further comprising:
   triggering a reset of the caching timer based on a preconfigured value in the PFDF, when the PFD fetching request is received.

6. The method according to claim 1, wherein the pushing comprises:
   distributing the updated PFD directly from the PFDF to the PCEF or to the TDF, respectively, or notifying the PCEF or, the TDF, respectively, to fetch the updated PFD within the allowed delay, if the allowed delay is smaller than the caching timer.

7. The method according to claim 1, wherein the synchronizing comprises:
   sending a PFD updating notification from the PFDF to the PCEF or to the TDF, respectively,
   wherein the PFD updating notification includes an application identifier and the allowed delay.

8. The method according to claim 7, further comprising:
   determining a validity of the application identifier based on the caching timer.

9. The method according to claim 8, further comprising:
   sending a PFD fetching request from the PCEF or from the TDF, respectively, to the PFDF, if the allowed delay is smaller than the caching timer;
   wherein the PFD fetching request only includes the valid application identifier.

10. The method according to claim 9, wherein the pushing comprises:
    pushing the updated PFD associated with the PFD fetching request.

11. An apparatus, comprising:
    at least one processor; and
    at least one memory including computer program code, wherein the at least one memory and the computer program code are configured, with the at least one processor, to perform a process comprising:
    synchronizing a caching timer and an allowed delay between a policy and charging enforcement function (PCEF) or a traffic detection function (TDF), and a packet flow description function (PFDF);
    comparing the caching timer and the allowed delay; and
    pushing an updated packet flow description (PFD) from the PFDF to the PCEF or to the TDF, respectively, based on a result of the comparing.

12. The apparatus according to claim 11, wherein the synchronizing comprises:
    sending a PFD fetching request which includes an application identifier from the PCEF or from the TDF, respectively, to the PFDF.

13. The apparatus according to claim 12, further comprising:
    determining a validity of the application identifier based on the caching timer,
    wherein the updated PFD is associated with the valid application identifier.

14. The apparatus according to claim 13, wherein the determining comprises:
    determining the application identifier is not valid, if the caching timer expires and no new PFD fetching request for the application identifier is received.

15. The apparatus according to claim 11, wherein the triggering comprises:
    triggering a reset of the caching timer based on a preconfigured value in the PFDF, when the PFD fetching request is received.

16. The apparatus according to claim 11, wherein the pushing comprises:
    distributing the updated PFD directly from the PFDF to the PCEF or to the TDF, respectively, or notifying the PCEF or the TDF, respectively, to fetch the updated PFD within the allowed delay, if the allowed delay is smaller than the caching timer.

17. The apparatus of claim 11, wherein the synchronizing comprises:
    sending a PFD updating notification from the PFDF to the PCEF or to the TDF, respectively,
    wherein the PFD updating notification includes an application identifier and the allowed delay.

18. The apparatus according to claim 17, further comprising:
   determining a validity of the application identifier based on the caching timer.

19. The apparatus according to claim 18, further comprising:
   sending a PFD fetching request from the PCEF or from the TDF, respectively, to the PFDF, if the allowed delay is smaller than the caching timer;
   wherein the PFD fetching request only includes the valid application identifier.

20. The apparatus according to claim 19, wherein the pushing comprises:
   pushing the updated PFD associated with the PFD fetching request.

* * * * *